UNITED STATES PATENT OFFICE.

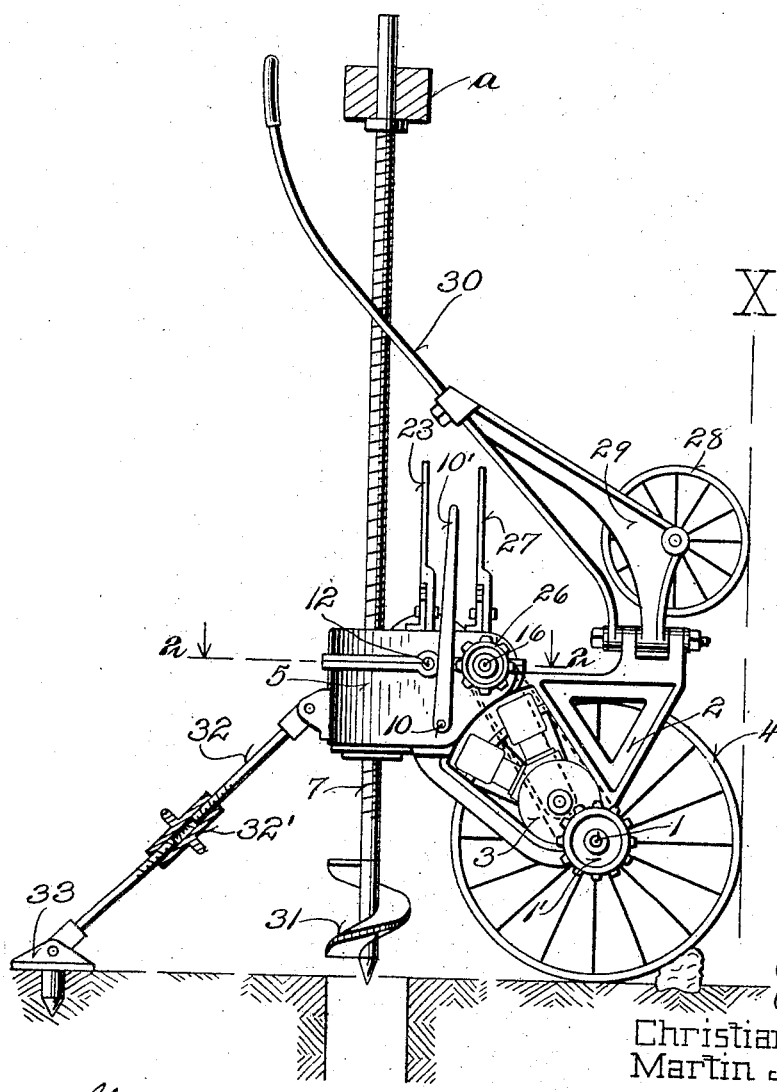

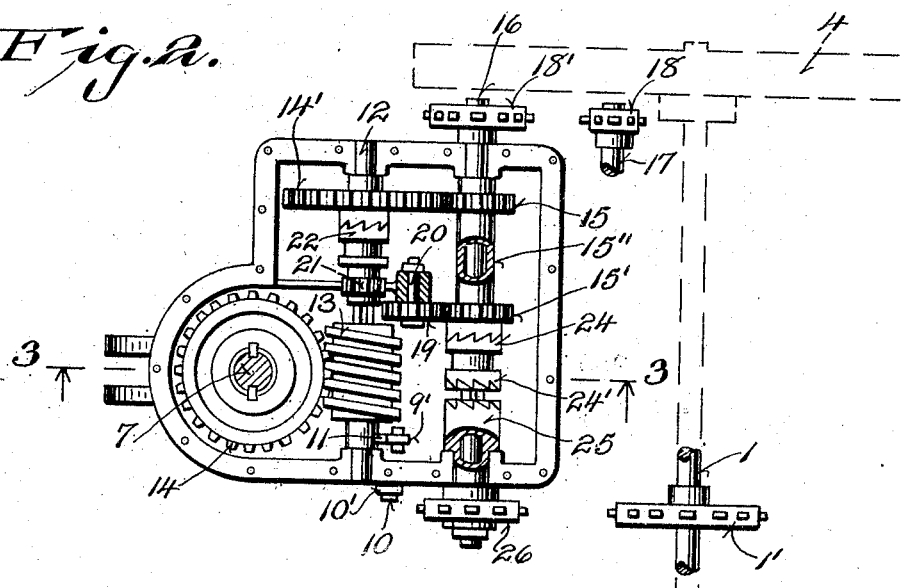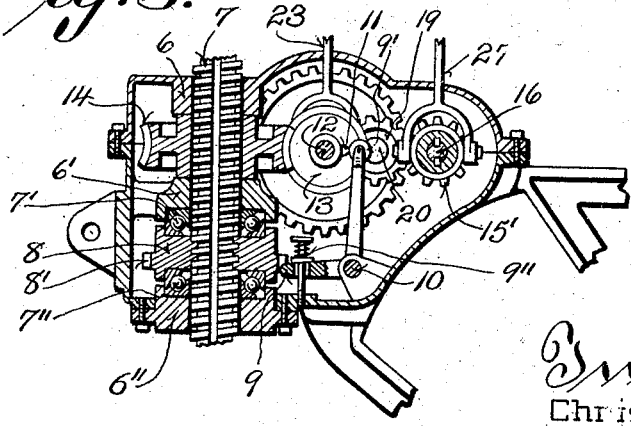

CHRISTIAN SKOTT, OF MILWAUKEE, AND MARTIN J. ROGNE AND ELMER J. ROGNE, OF DE PERE, WISCONSIN.

POWER-DRIVEN POSTHOLE-EXCAVATOR.

1,376,045. Specification of Letters Patent. Patented Apr. 26, 1921.

Application filed October 19, 1920. Serial No. 417,909.

*To all whom it may concern:*

Be it known that we, CHRISTIAN SKOTT, MARTIN J. ROGNE, and ELMER J. ROGNE, all citizens of the United States, and residents, respectively, CHRISTIAN SKOTT of Milwaukee, in the county of Milwaukee and State of Wisconsin, and MARTIN J. ROGNE and ELMER J. ROGNE of De Pere, in the county of Brown and State of Wisconsin, have invented certain new and useful Improvements in Power-Driven Posthole-Excavators; and we do hereby declare that the following is a full, clear, and exact description thereof.

Our invention has for its object to provide a simple, economical and readily adjustable power driven post-hole excavator, its arrangement and construction being such that it can be transported from place to place under its own power, with provision for swinging the entire mechanism about a truck axle, whereby holes for various purposes may be excavated at predetermined angles.

Another object of our invention is to provide a truck mechanism with means for adjusting it to a working position, and locking it in its adjusted position, and means for tilting it in another direction, whereby ground wheels will come into play for transportation purposes.

With the above and other objects in view, the invention consists in certain peculiarities of construction and combination of mechanical elements, as hereinafter described, illustrated and set forth in the claims.

In the drawings,

Figure 1 represents a side elevation of a machine embodying the features of our invention, the same being illustrated with certain parts in section, and in its adjusting position for work.

Fig. 2 is a large detail plan view of the driving mechanism employed in imparting motion from a motor to a threaded spindle, which carries the excavating tool, the driving mechanism being adapted to rotate the spindle and to also intermittently feed it downwardly for excavating purposes, and Fig. 3 a detail sectional view of said mechanism, the section being indicated by line 3—3 of Fig. 2.

Referring by characters to the drawings, 1 indicates a truck axle having pivotally mounted thereon a skeleton frame 2, which frame carries an engine or motor 3 preferably of the internal combustion type. The axle 1 is also provided with the usual traction wheels 4 and a driving sprocket wheel 1'. The skeleton truck frame 2 also carries a two-part housing 5, which housing, as best shown in Fig. 3, is provided with bearings 6, 6' and 6'' for a threaded spindle 7. The spindle bearings 6' and 6'' are equipped with suitable radial end thrust sets of ball bearings 7' and 7'' between which is mounted a feed nut 8, the same being in threaded connection with the spindle. The feed nut is adapted to intermittently force the spindle downwardly to its work and it is provided with peripheral teeth 8', which are arranged to engage the end of one arm 9 of a bell crank lever, the same being pivotally mounted in the housing by means of a rock shaft 10, one end of which projects through the housing and carries a manually operative lever 10'. The other arm of the bell crank is provided with a roller 9' which is adapted to be engaged by a tappet cam 11, which cam is secured to a counter-shaft 12 that has its bearings in the housing.

The counter-shaft 12 also carries a worm 13, which imparts motion to a worm wheel 14, that is in splined connection with the spindle 7 to thus impart rotary motion to said spindle, and permit independent longitudinal motion thereof. Motion is imparted to the counter-shaft 12 selectively in two directions. In its normal working direction, this motion is imparted through a toothed gear wheel 14', loosely mounted on the shaft 12, which gear wheel meshes with a pinion 15 that is for driving purposes, fixed on a driven shaft 16, said shaft being mounted parallel with the shaft 12 and journaled in the housing 5, as best shown in Fig. 3. The shaft 16 receives its motion from the motor shaft 17, which motor shaft carries a sprocket wheel 18 that is connected by a standard chain belt to a larger sprocket wheel 18' secured to the driven shaft.

In order to obtain a reverse motion upon the counter-shaft 12, we provide a second toothed pinion 15', which pinion is mounted upon a sleeve 15'' borne on the shaft 16 and rotates therewith under clutch control. The pinion 15' meshes with an idle pinion 19 that is revoluble upon a stud shaft 20 carried by the housing, the second pinion 19 being arranged for selective meshed engagement with a like pinion 21 that is carried by a clutch sleeve 22, the same being in splined connection with the counter-shaft 12.

As shown in Fig. 2 of the drawings, the teeth of the clutch sleeve 22 are engaged with corresponding hub teeth of the gear wheel 14', whereby said gear wheel will impart rotary motion to the counter-shaft 12 to feed the spindle 7 downwardly to its work through its worm gear connection.

Should it be desired to lift the spindle or extract it from a finished hole, the clutch sleeve 22 together with its pinion is shifted longitudinally by means of a controlling lever 23, whereby the wheel 14' is disengaged from its locked engagement with the shaft 12, and the pinion 21 will slidingly engage the idle pinion or toothed wheel 19.

Thus the direction of rotation of the shaft 12 is reversed and the speed of rotation of said shaft is accelerated, whereby the spindle 7 is quickly withdrawn from its work. In effecting this withdrawal of the spindle from the completed post hole, the hand lever 10' is actuated by the operator, whereby the bell crank is manually shifted so as to cause its finger or arm 9 to engage the teeth 8' of the feed nut 8, and hence said nut is held against rotation during this operation to obviously cause the spindle to feed upwardly, due to its threaded engagement with feed nut 8. As shown in Fig. 2 of the drawings, the companion pinions 15 and 15' are loosely mounted upon the drive shaft 16, the same being connected by the sleeve 15''. These pinions are normally locked to the drive shaft by one face 24 of a toothed clutch collar, which collar is splined upon the shaft 16. The clutch collar is also provided with a toothed face 24', which is arranged to engage a corresponding toothed face of a hub 25 that is loosely mounted upon the shaft 16. This hub is journaled in the housing 5 and shouldered to prevent end movement thereof. The outer end of the hub 25 carries a sprocket wheel 26, which is in belt drive connection with a sprocket wheel 1', that is fixed to the truck axle 1, as previously mentioned.

When it is desired to disconnect the driving mechanism of the spindle from the motor, the clutch hub carrying the teeth 24' is longitudinally shifted upon the shaft 16 by a controlling lever 27, whereby the toothed pinions 15 and 15' are disconnected from said shaft and the sleeve 25 of the sprocket wheel 26 is locked thereto. Hence, it will be seen that when this shifting of the clutch sleeve under control of lever 27 takes place, the engine power is transmitted through sprocket wheels 18 and 18' to shaft 16, and from thence through sprocket wheels 26 and 1' to the tractor wheels, which are mounted upon the axle 1 and when this shift in gearing is effected, the truck carrying the machinery is shifted from the vertical position shown in Fig. 1 to a horizontal position, as indicated by the dotted line $x$, which line diagrammatically illustrates the position assumed by the machine when it is propelled from place to place. When the machine is to be transported, provision is made for supporting the rear portion thereof by means of a caster wheel 28, which caster wheel is mounted in a bracket 29 that is in pivotal union with the frame 2, and said bracket 29 also carries steering bars 30.

It will be observed that the machine in some instances may operate when its wheels rest upon the ground, that is, the spindle in this position is approximately horizontal and could be utilized for boring horizontal holes, as for example, in excavations or cellars, where it is desirable to bore into the cross streets for the purpose of setting water mains, gas supply pipes, or the like.

Referring again to Fig. 1, the parts are in position to excavate a vertical post hole, and the spindle in this instance is provided with an auger blade or head 31, and obviously the the head shown may be removed, whereby various forms of heads may be attached for special work.

In order to hold the machine rigid in its vertical working position, as shown, we provide an anchor leg 32, which is preferably adjustable as to length, by means of a right and left threaded sleeve 32', the frame of the leg being in pivotal union with the housing 5. The lower end of the leg is provided with a pivoted gripping foot 33, which may be embedded in the soil to prevent vibration of the machine when working, whereby it is held securely to its work. Obviously, when it is desired to vary the angle of the excavating spindle, the anchor leg may be adjusted to accurately determine the angle of boring, as may be required.

From the foregoing description, it is apparent that when the spindle is fed downwardly by the worm wheel 14, the feed nut 8, due to its frictional engagement of the spindle, will revolve therewith and with each rotation of the counter-shaft 12, the bell crank lever under cam control will automatically effect the locking engagement of the teeth 8' of the nut, and thereby delay the same in its rotation momentarily to thus cause the spindle to feed a predetermined distance downwardly at intervals. The arm 9 of the bell crank lever is positively actuated to effect engagement with the teeth 8' of the nut by the cam 11, and its reverse or disengaging movement is effected by a spring 9'', which is mounted upon its suitable stem and is attachable to impinge against the arm in one direction to free it from the engagement mentioned at the moment the peak 11 of the cam passes under the bell crank roller.

While we have shown and described a specific mechanism for accomplishing the desired result, minutely as to detail, obviously we may vary the structural features as exemplified, and in the drawings and described within the scope of the claims as interpreted by those skilled in mechanics.

While we have shown and described a force feed for the tool spindle, obviously under certain soil conditions the feed ratchet may be dispensed with together with threading the spindle, and as shown in Fig. 1 the weight $a$ may be utilized in connection with the weight of the spindle to feed the tool head 31 to its work.

We claim:

1. A power driven post hole excavator comprising an axle having tractor wheels, a truck wheel mounted upon the axle and adapted to swing thereabout for adjustment, a rear wheel pivotally connected to the frame having steering bearings, an anchor leg carried by the frame for setting the same in predetermined adjusted working positions, and a power driven rotary spindle carrying an excavating blade mounted in the frame and including means for rotating the spindle and for intermittently feeding the same longitudinally.

2. A power driven post hole excavator comprising an axle having tractor wheels mounted thereon, a truck frame mounted on the axle and adapted to swing thereabout for adjustment, a threaded spindle mounted in the frame having a cutting blade at its lower end, an anchor leg carried by the frame for supporting the spindle in predetermined angular positions, a power driven counter-shaft journaled in the frame, driving means connecting the counter-shaft and spindle whereby the same is rotated, a nut in threaded union with the spindle and means associated with the counter-shaft and nut, whereby the latter is intermittently held against rotation.

3. A power driven post hole excavator comprising an axle, tractor wheels mounted thereon, a truck mounted upon the axle and adapted to swing thereabout for adjustment, means carried by the swinging truck frame for sustaining it at predetermined angles, a threaded spindle journaled in the truck frame, a counter-shaft journaled in the truck frame, a worm gear connected between the counter-shaft and spindle whereby the same is rotated, a nut in threaded union with said spindle and arranged to normally rotate therewith, cam controlled means associated with the counter-shaft for intermittently locking the feed nut against rotation, a one-way rotatable drive shaft, clutch and gear connections between the drive shaft and counter-shaft for selectively rotating said counter-shaft in either direction, and clutch control gear mechanism connecting the drive shaft and truck wheels.

In testimony that we claim the foregoing we have hereunto set our hands at Milwaukee, in the county of Milwaukee and State of Wisconsin.

CHRISTIAN SKOTT.
MARTIN J. ROGNE.
ELMER J. ROGNE.